United States Patent
Liang et al.

(10) Patent No.: US 10,518,624 B2
(45) Date of Patent: Dec. 31, 2019

(54) MOTOR HAVING NON-RECTANGULAR ROTOR MAGNETS

(71) Applicant: Ford Global Technologies, LLC, Dearborn, MI (US)

(72) Inventors: Feng Liang, Troy, MI (US); C Bing Rong, Canton, MI (US); Michael W. Degner, Novi, MI (US); Lusu Guo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/623,700

(22) Filed: Jun. 15, 2017

(65) Prior Publication Data
US 2018/0361842 A1 Dec. 20, 2018

(51) Int. Cl.
*B60K 6/26* (2007.10)
*H02K 1/27* (2006.01)

(52) U.S. Cl.
CPC ............ *B60K 6/26* (2013.01); *H02K 1/2766* (2013.01); *B60K 2006/264* (2013.01); *B60Y 2200/92* (2013.01); *B60Y 2400/60* (2013.01); *Y10S 903/906* (2013.01)

(58) Field of Classification Search
CPC .............. B60K 6/26; B60K 2006/264; B60Y 2400/60; H02K 1/2773; H02K 1/2766; H02K 1/272
See application file for complete search history.

(56) References Cited

U.S. PATENT DOCUMENTS

| | | | | |
|---|---|---|---|---|
| 4,531,605 A | * | 7/1985 | Scholz | B60K 6/105 180/165 |
| 5,337,848 A | * | 8/1994 | Bader | B60K 6/36 180/65.25 |
| 6,034,458 A | | 3/2000 | Uetake et al. | |
| 6,093,974 A | * | 7/2000 | Tabata | B60K 6/365 180/65.25 |
| 6,542,348 B1 | * | 4/2003 | Stupak, Jr. | H01F 13/003 335/284 |
| 6,740,002 B1 | * | 5/2004 | Stridsberg | B60K 6/405 477/14 |
| 7,906,881 B2 | | 3/2011 | Enomoto et al. | |
| 8,040,007 B2 | * | 10/2011 | Petrov | H02K 1/02 310/156.27 |
| 8,446,121 B1 | * | 5/2013 | Parsa | H02K 29/03 310/156.01 |
| 9,337,692 B2 | | 5/2016 | Murota et al. | |
| 2002/0180295 A1 | * | 12/2002 | Kaneda | H02K 1/278 310/156.43 |
| 2004/0063536 A1 | * | 4/2004 | Atarashi | B60K 6/26 477/3 |

(Continued)

*Primary Examiner* — Frank B Vanaman
(74) *Attorney, Agent, or Firm* — David Kelley; Brooks Kushman P.C.

(57) ABSTRACT

A hybrid powertrain utilizes a motor with a permanent magnet rotor. The rotor is formed by inserting parallelepiped magnets into slots. To reduce the likelihood of demagnetization, the net magnetization of each magnet is oriented parallel to a sidewards surface of the magnet and not perpendicular to an outwards surface of the magnet. The magnets may be arranged in multiple rows. The magnets in each row may be perpendicular to a rotor radial or diagonal to a rotor diagonal.

17 Claims, 4 Drawing Sheets

(56) References Cited

U.S. PATENT DOCUMENTS

| | | | |
|---|---|---|---|
| 2005/0140236 A1* | 6/2005 | Jeong | H02K 1/2766 310/156.53 |
| 2006/0220484 A1* | 10/2006 | Stephens | H02K 1/278 310/156.43 |
| 2008/0179980 A1* | 7/2008 | Dawsey | H02K 1/2766 310/156.53 |
| 2010/0225431 A1* | 9/2010 | Kadota | H02K 1/2766 336/130 |
| 2011/0088249 A1* | 4/2011 | Stephens | H02K 15/03 29/598 |
| 2013/0134713 A1* | 5/2013 | Jacob | H02K 7/18 290/52 |

* cited by examiner

MOTOR HAVING NON-RECTANGULAR ROTOR MAGNETS

TECHNICAL FIELD

This disclosure related to the field of hybrid electric vehicles. More particularly, the disclosure relates to a structure of a permanent magnet rotor.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

In order to reduce fuel consumption, some vehicles include hybrid powertrains which utilize energy storage to supplement the power produced by the internal combustion engine. These powertrains permit the vehicle to operate a portion of the time with the engine off and the remainder of the time at torque levels at which the engine is more efficient. Hybrid powertrains also enable the capture and later use of energy that would otherwise be dissipated by the braking system.

SUMMARY

In some embodiments, a motor includes a stator, a rotor, and a plurality of permanent magnets. The rotor is supported for rotation with respect to the stator and defines a plurality of magnet pockets. Each magnet of the plurality of permanent magnets has a non-cuboid parallelepiped form and has a net magnetization direction that is not perpendicular to any surface of the magnet. The magnets may be arranged in an inner row and an outer row. An outer surface of each magnet may be oriented diagonally or perpendicular to a radial of the rotor.

In some embodiments, a motor includes a stator, a rotor, and a plurality of permanent magnets. The rotor is supported for rotation with respect to the stator and defines a plurality of magnet pockets. Each magnet of the plurality of permanent magnets has a non-cuboid form and has a net magnetization direction that is parallel to a sideward surface and not perpendicular to an outwards surface of the magnet. The magnets may be arranged in an inner row and an outer row. An outer surface of each magnet may be oriented diagonally or perpendicular to a radial of the rotor.

A vehicle includes a rotor and a plurality of permanent magnets. The rotor defines a plurality of magnet pockets into which the permanent magnets are inserted. The magnets have a non-cuboid parallelepiped form and have a net magnetization direction that is not perpendicular to any magnet surface. The net magnetization direction may be parallel to a sideward surface of the magnet. The vehicle may also include an inverter configured to induce alternating currents in windings in a stator to establish magnetic fields that cause the rotor to rotate with respect to the stator. The vehicle may also include an internal combustion engine selectively coupled to the rotor by a clutch. The vehicle may also include a multi-speed transmission configured to driveably connect the rotor to vehicle wheels.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
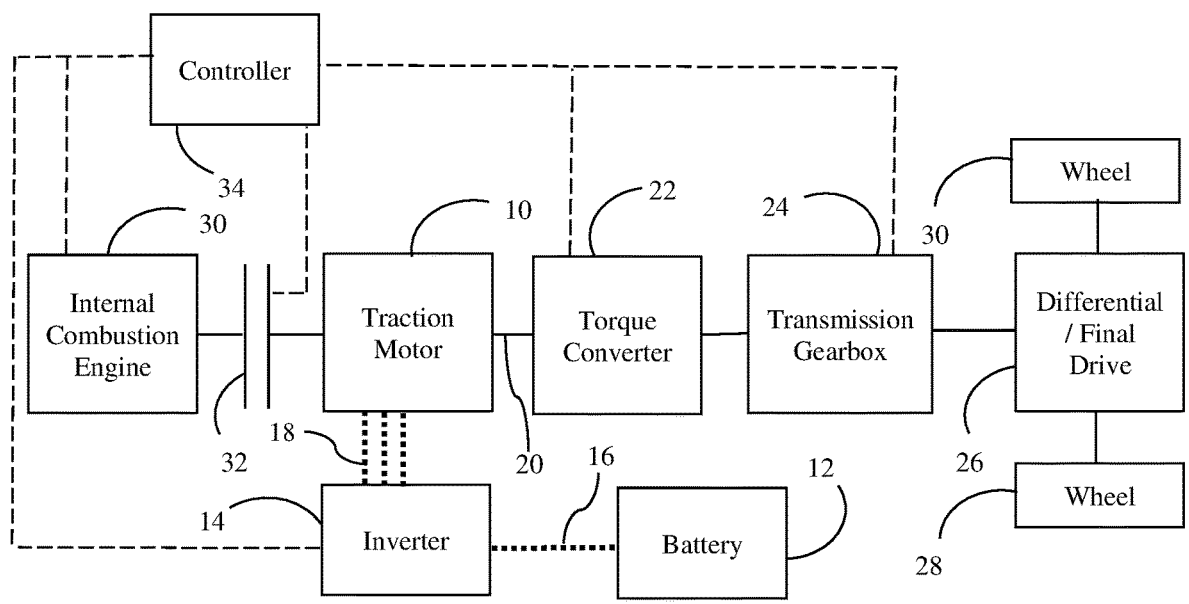
FIG. 1 is a schematic diagram illustrating a hybrid vehicle powertrain.

FIG. 1 schematically illustrates a hybrid vehicle powertrain. Connections providing for transmission of mechanical power are illustrated with solid lines. Connections providing for flow of electrical power are illustrated with dotted lines. Dashed lines indicate the flow of control signals. Traction motor 10 generates torque utilizing stored electrical energy from battery 12. In some operating modes, traction motor 10 may be operated to generate electrical power which is then stored in battery 12 for later use. Power is transmitted between the battery 12 and inverter 14 via Direct Current (DC) bus 16. Inverter 14 regulates the magnitude and phase of the Alternating Current (AC) voltage applied to connector 18 which connects the inverter 14 to windings of motor 10. The rotor of traction motor 10 is fixed to transmission input shaft 20. Power from transmission input shaft 20 is conveyed to vehicle wheels via torque converter 22, gearbox 24, and differential 26.

Torque converter 22 includes an impeller fixedly connected to the transmission input shaft 20 and a turbine fixedly connected to the input of gearbox 24. Torque converter 22 transmits power from the impeller to the turbine whenever the impeller rotates faster than the turbine. Torque converter 22 may also include a stator which multiplies the torque such that the torque on the turbine is greater than the torque on the impeller. Torque converter 22 may also include a lockup clutch that selectively couples the impeller to the turbine for more efficient power transfer when the slip associated with the hydrodynamic power transfer between the impeller and turbine is not required.

Gearbox 24 includes several clutches and brakes that establish various power flow paths from the gearbox input shaft to the transmission output shaft. These power flow paths have different speed ratios. The transmission shifts from one power flow path to another power flow path by disengaging one or more clutches or brakes and engaging other clutches or brakes. A neutral mode is established in which no power flow path between the gearbox input and the transmission output exists. Gearbox 24 may also include a parking pawl that may be engaged to hold the transmission output stationary when the vehicle is unoccupied.

The transmission output shaft is connected to differential 26 which divides the power between left and right driven wheels 28 and 30. The differential permits slight speed differences between the wheels such as when the vehicle turns a corner.

Internal combustion engine 32 is selectively coupled to transmission input shaft 20 by clutch 32. Note that transmission input shaft 20 extends through traction motor 10. When clutch 32 is engaged, engine 30 and traction motor 10 rotate at the same speed and the torque on transmission shaft 20 is equal to the sum of the torque produced by engine 30 and the torque produced by traction motor 10. In some operating modes, engine 30 may provide all power for propulsion by setting the traction motor torque to zero. In other operating modes, the motor may draw power from battery 12 to assist in propelling the vehicle. In still other operating modes, the engine may produce more power than required for propulsion with the motor diverting some of the power to charge battery 12. When clutch 32 is disengaged, all propulsion is provided by traction motor 10.

The powertrain is controlled by controller 34. Controller 34 may be a single micro-processor or multiple communicating micro-processors. Controller 34 accepts commands from the driver via the accelerator pedal position, the brake pedal position, the position of the shift selector (PRNDL), etc. The controller also uses signals from various sensors. The controller controls engagement and disengagement of clutch 32, the torque converter lockup clutch, and the clutches and brakes within gearbox 24. The controller also sends commands to the engine 30 and to inverter 14 to control the torque of motor 10.

Figure 2:
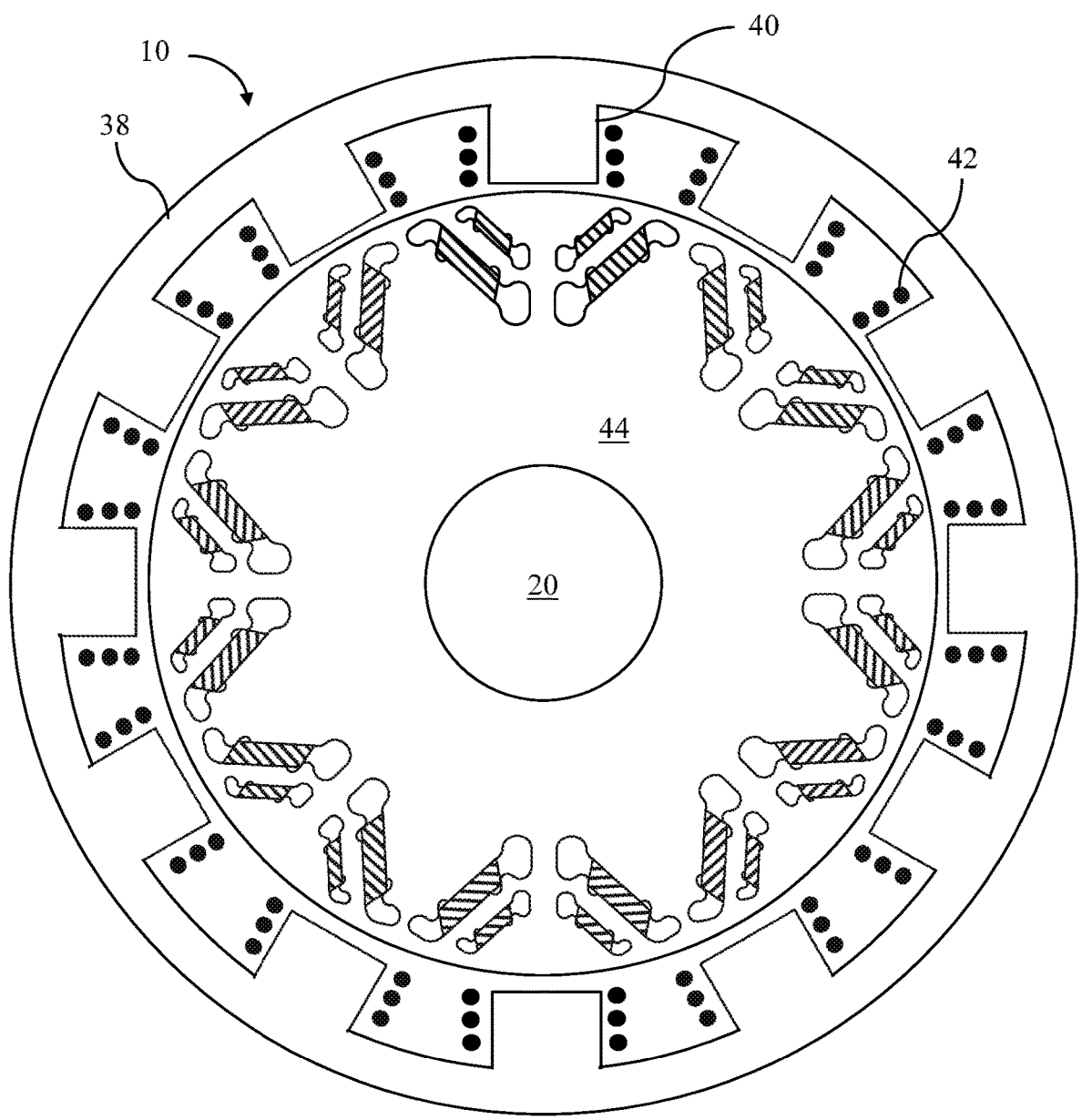
FIG. 2 is a cross section of a permanent magnet motor.

FIG. 2 shows a cross section of motor 10. Motor 10 includes a fixed stator 38 having a set of stator poles 40 each associated with a winding 42. Each winding is connected to one of the three AC phases. The stator poles surround rotor 44 which is fixed to transmission input shaft 20. Permanent magnets are strategically arranged within pockets in rotor 44 to magnetize the rotor. These magnets and pockets are discussed in more detail below with reference to FIGS. 3 and 4.

Current in the windings 42 create magnetic fields in the stator poles 40. Magnetic forces between the stator poles and the rotor exert torque on the rotor. The magnitude of the torque depends upon the current in the windings and the location of the stator magnetic field relative to the rotational position of the rotor. Inverter 14 adjusts the voltage applied to the stator windings to achieve a desired current magnitude and adjusts the current phase angle to locate the stator magnetic field relative to rotor position. During generation, inverter 14 converts AC power from the machine into DC power to be stored in battery 12.

In some circumstances, the magnetic field produced by the stator may act to demagnetize the permanent magnets. Any demagnetization of the permanent magnets reduces the motor performance in the future.

Figure 3:
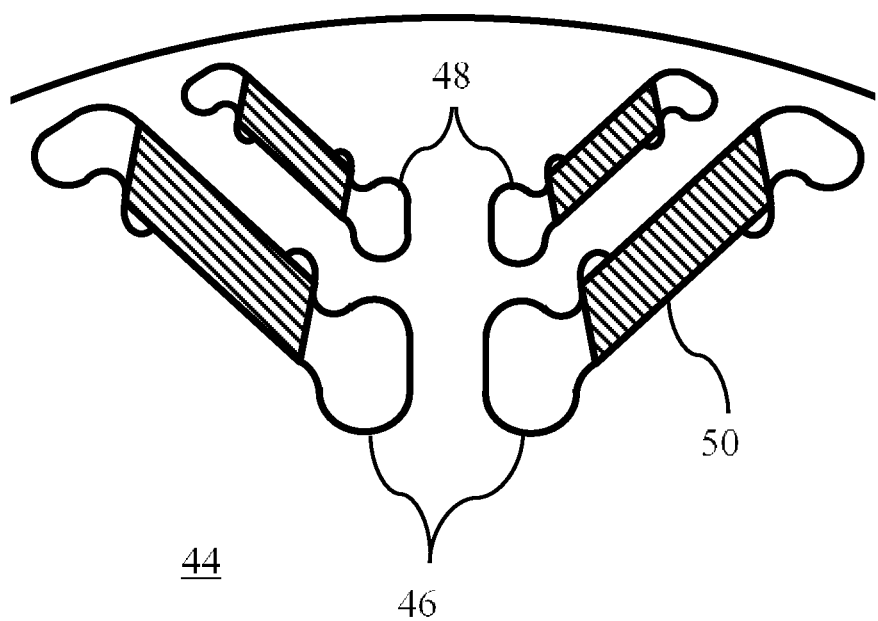
FIG. 3 is a detail view of a portion of the rotor of the motor of FIG. 2.
Figure 4:
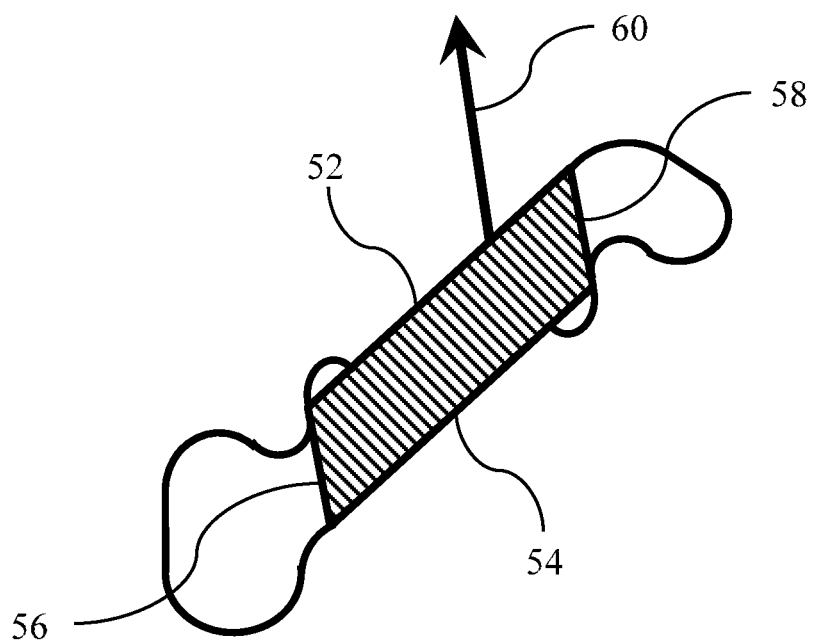
FIG. 4 is a detail view of the permanent magnet and the magnet pocket of the rotor of FIG. 2.

FIG. 3 is a detailed view of one rotor pole of rotor 44. For each rotor pole, the rotor has two inner pockets 46 and two outer pockets 48. These pockets are generally diagonal to a radial of the rotor (a radial being a line from the rotor axis to the rotor perimeter). A magnet 50 is contained within each pocket. Each magnet has a non-rectangular parallelogram cross section. The magnets have a constant thickness in the rotor axial direction such that, in three dimensions, the magnets are non-cuboid parallelepipeds. FIG. 4 shows an individual pocket and permanent magnet. Each magnet has an outward surface 52, and inward surface 54, and two sideward surfaces 56 and 58. Outward surface 52 is parallel to inward surface 54. Sideward surfaces 56 and 58 are parallel to one another but not perpendicular to outward surface 52. The net magnetization direction of the magnet is indicated by 60. The net magnetization direction not perpendicular to any magnet surface. The net magnetization may be parallel to the sideward surfaces 56.

The inventors have discovered that demagnetization is less likely to occur when the net magnetization direction is not perpendicular to the outward magnet surface. Use of this magnetization direction permits use of thinner magnets for a given application without experiencing demagnetization. Having the magnetization direction parallel to a sideward surface permits the magnets to be cut from a bar magnet, simplifying manufacture.

Figure 5:
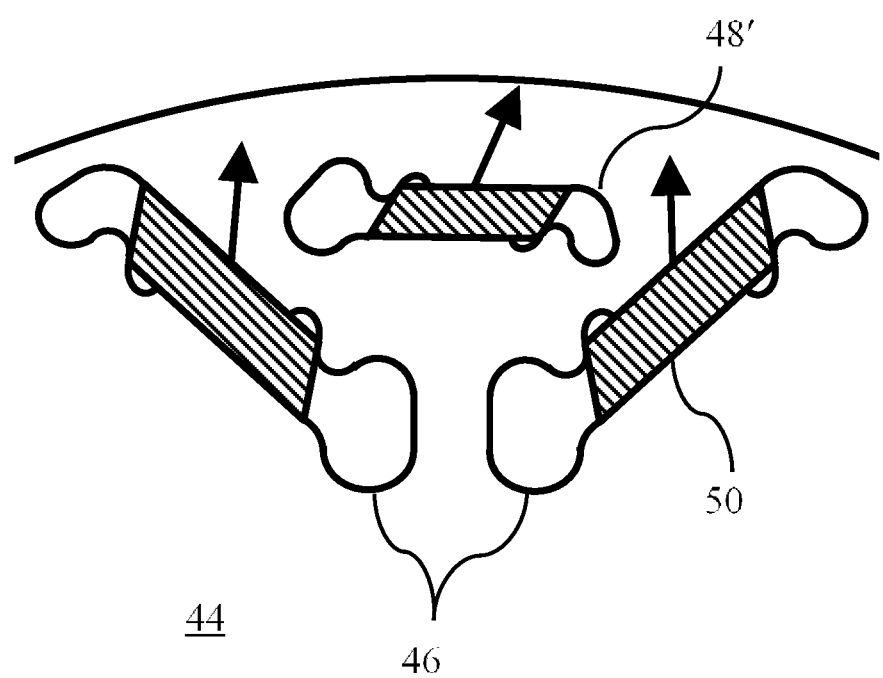
FIG. 5 is a detail view of a portion of a rotor of an alternative embodiment of the rotor of FIG. 2.

FIG. 5 illustrates an alternative arrangement of magnets in the rotor. Instead of the two diagonal outer pockets of the embodiment of FIGS. 2 and 3, a single outer magnet pocket 48' is oriented perpendicular to a radial of the rotor. The net magnetization direction of the magnet in this outer pocket is diagonal to a radial of the rotor. In other alternative embodiments, the inner row of magnet pockets may be perpendicular to a rotor radial. Other alternative embodiments may have only one row of magnet pockets which may be oriented diagonally or perpendicularly to a rotor radial.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor comprising:
   a stator;
   a rotor supported for rotation with respect to the stator, the rotor defining a plurality of magnet pockets; and
   a plurality of permanent magnets inserted into respective magnet pockets, each magnet having a non-cuboid parallelepiped form and having a net magnetization direction that is not perpendicular to any surface of the magnet; and
   wherein the plurality of magnets are arranged in sets of magnets that extend radially about the rotor, each set including a first magnet that is disposed between second and third magnets, the first magnet of each set having an outer surface that is oriented perpendicular to a radial of the rotor intersecting the first magnet, and the second and third magnets having outer surfaces that are oriented diagonally to radials of the rotor intersecting, the second and third magnets, respectively.

2. The motor of claim 1 wherein the plurality of permanent magnets comprises a first row of magnets that extends radially inward of a second row of magnets.

3. The motor of claim 1 wherein the net magnetization direction of each of the first, second, and third magnets is non-parallel with the net magnetization directions of the other of the first, second, and third magnets.

4. The motor of claim 1 wherein the second and third magnets are mirror images relative to a radial of the rotor that extends between the second and third magnets.

5. A motor comprising:

a stator;

a rotor supported for rotation with respect to the stator, the rotor defining a plurality of magnet pockets; and a plurality of permanent magnets inserted into respective magnet pockets, each magnet having a non-cuboid form and having a net magnetization direction that is not perpendicular to an outward surface of the magnet, wherein the plurality of magnets are arranged in sets of magnets that extend radially about the rotor, each set of magnets including a first magnet that is disposed between second and third magnets, the first magnet of each set having an outer surface that is oriented perpendicular to a radial of the rotor intersecting the first magnet, and the second and third magnets having outer surfaces that are oriented diagonally to radials of the rotor intersecting the second and third magnets, respectively, wherein the net magnetization direction of each magnet of the first, second, and third magnets of each set is non-parallel with the net magnetization directions of the other magnets of the first, second, and third magnets of each set.

6. The motor of claim 5 wherein each of the plurality of permanent magnets has a parallelepiped form.

7. The motor of claim 5 wherein the plurality of permanent magnets comprises a first row of magnets and a second row of magnets.

8. The motor of claim 7 wherein each magnet of the first row of magnets has an outer surface that is oriented diagonally to a radial of the rotor.

9. The motor of claim 7 wherein each magnet of the second row of magnets has an outer surface that is oriented perpendicular to a radial of the rotor.

10. The motor of claim 5 wherein the second and third magnets are mirror images relative to a radial of the rotor that extends between the second and third magnets.

11. The motor of claim 5, wherein each magnet has a net magnetization direction that is parallel to a sideward surface of the magnet.

12. A vehicle comprising:

a rotor defining a plurality of magnet pockets; and a plurality of permanent magnets inserted into respective magnet pockets, each magnet having a non-cuboid parallelepiped form and having a net magnetization direction that is not perpendicular to any magnet surface, wherein the plurality of magnets are arranged in sets of magnets that extend radially about the rotor, each set including a first magnet that is disposed between second and third magnets, the first magnet of each set having an outer surface that is oriented perpendicular to a radial of the rotor intersecting the first magnet, and the second and third magnets having outer surfaces that are oriented diagonally to radials of the rotor intersecting the second and third magnets, respectively.

13. The vehicle of claim 12 further comprising an inverter configured to induce alternating currents in windings in a stator to establish magnetic fields that cause the rotor to rotate with respect to the stator.

14. The vehicle of claim 13 further comprising an internal combustion engine selectively coupled to the rotor by a clutch.

15. The vehicle of claim 13 further comprising a multi-speed transmission configured to driveably connect the rotor to vehicle wheels.

16. The vehicle of claim 12 wherein the net magnetization direction of each of the first, second, and third magnets is non-parallel with the net magnetization directions of the other of the other of the first, second, and third magnets.

17. The vehicle of claim 12 wherein the second and third magnets are mirror images relative to a radial of the rotor that extends between the second and third magnets.

* * * * *